US010697998B2

(12) United States Patent
Sadeghian Marnani et al.

(10) Patent No.: US 10,697,998 B2
(45) Date of Patent: Jun. 30, 2020

(54) METHOD OF PERFORMING SURFACE MEASUREMENTS ON A SURFACE OF A SAMPLE, AND SCANNING PROBE MICROSCOPY SYSTEM THEREFORE

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Aliasghar Keyvani Janbahan, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/769,881

(22) PCT Filed: Oct. 21, 2016

(86) PCT No.: PCT/NL2016/050720
§ 371 (c)(1),
(2) Date: Apr. 20, 2018

(87) PCT Pub. No.: WO2017/069622
PCT Pub. Date: Apr. 27, 2017

(65) Prior Publication Data
US 2018/0306837 A1    Oct. 25, 2018

(30) Foreign Application Priority Data
Oct. 23, 2015 (EP) ..................................... 15191311

(51) Int. Cl.
*G01Q 20/00* (2010.01)
*G01Q 30/04* (2010.01)
(Continued)

(52) U.S. Cl.
CPC ............. *G01Q 20/00* (2013.01); *G01Q 30/04* (2013.01); *G01Q 60/32* (2013.01); *G01Q 60/34* (2013.01)

(58) Field of Classification Search
CPC ........ G01Q 60/32; G01Q 60/34; G01Q 30/04; G01Q 60/24; G01Q 20/00
See application file for complete search history.

(56) References Cited

U.S. PATENT DOCUMENTS 7,066,014 B2 * 6/2006 Salapaka ................ G01Q 10/06
73/105
9,678,103 B2 * 6/2017 Abramovitch ......... G01Q 20/02
(Continued)

OTHER PUBLICATIONS

Karvinen, Kai S., et al. "Direct tip-sample force estimation for high-speed dynamic mode atomic force microscopy." IEEE Transactions on Nanotechnology 13.6 (2014): 1257-1265 (Year: 2014).*

*Primary Examiner* — Wyatt A Stoffa
(74) *Attorney, Agent, or Firm* — Leydig, Voit & Mayer, Ltd.

(57) ABSTRACT

This document relates to a method of performing surface measurements on a surface of a sample using a scanning probe microscopy system. The system comprises a sample support structure for supporting a sample, a sensor head including a probe comprising a cantilever and a probe tip arranged on the cantilever, and an actuator for scanning the probe tip relative to the substrate surface for mapping of the nanostructures. The method comprising the steps of: vibrating the cantilever using an actuator and moving the probe relative to the substrate surface for performing said scanning. The probe is held at a distance to the substrate surface such as to allow contact at a plurality of intermittent contact moments between the probe tip and the surface during said vibrating of the cantilever. The steps of vibrating of the cantilever and moving of the probe are performed concur-
(Continued)

rently. For performing the surface measurements, the method comprises obtaining a sensor signal indicative of a position of the probe tip during said scanning, and analyzing this signal by quantifying two or more frequency components in a Fourier transform for determining an estimate of a force value of a force between said substrate surface and said probe tip during said contact moments.

20 Claims, 9 Drawing Sheets

(51) Int. Cl.
*G01Q 60/34* (2010.01)
*G01Q 60/32* (2010.01)

(56) References Cited

U.S. PATENT DOCUMENTS

2005/0066713 A1\* 3/2005 Salapaka ............... G01Q 10/06
  73/105
2014/0130213 A1\* 5/2014 Gellineau .............. G01Q 20/02
  850/40

\* cited by examiner

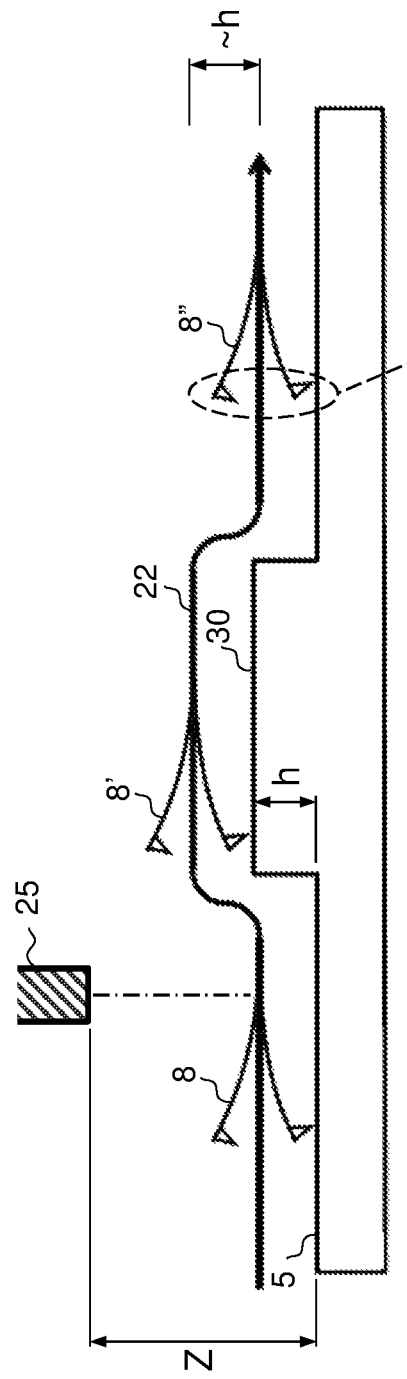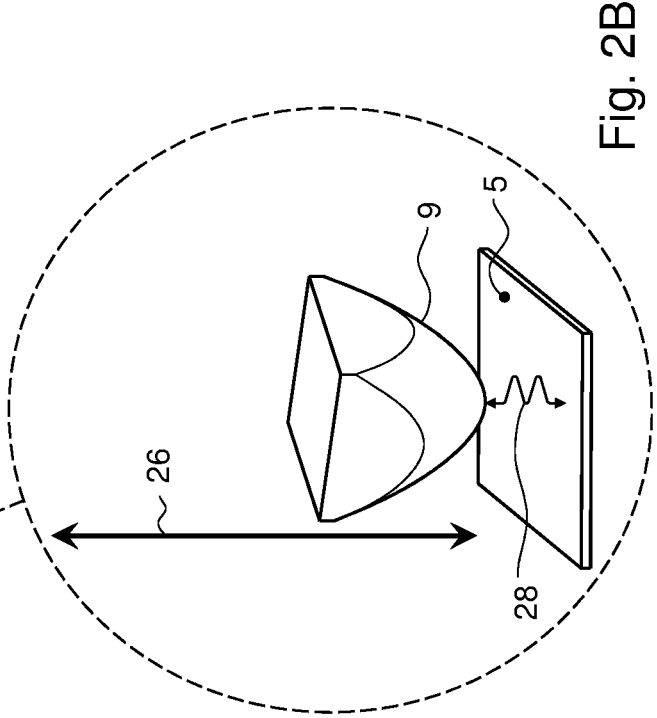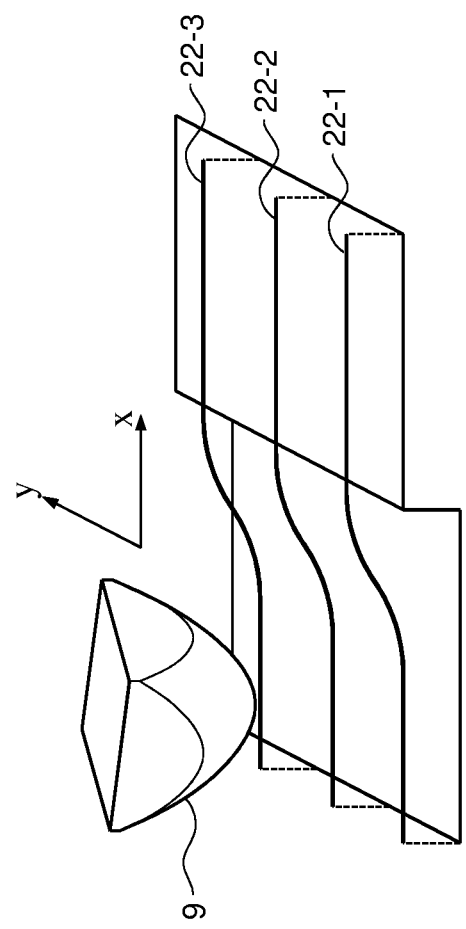
Fig. 2A
Fig. 2B
Fig. 2C

METHOD OF PERFORMING SURFACE MEASUREMENTS ON A SURFACE OF A SAMPLE, AND SCANNING PROBE MICROSCOPY SYSTEM THEREFORE

CROSS-REFERENCE TO RELATED APPLICATIONS

This patent application is a U.S. National Phase of PCT International Application No. PCT/NL2016/050720, filed Oct. 21, 2016, which claims priority to European Application No. 15191311.8, filed Oct. 23, 2015, which are both expressly incorporated by reference in their entireties, including any references contained therein.

FIELD OF THE INVENTION

The present invention is directed at a method of performing surface measurements on a surface of a sample using a scanning probe microscopy system, the system comprising a sample support structure for supporting a sample, a sensor head including a probe comprising a cantilever and a probe tip arranged on the cantilever, and an actuator for scanning the probe tip relative to the substrate surface for mapping of the nanostructures, the method comprising the steps of: vibrating the cantilever using an actuator; moving the probe relative to the substrate surface for performing said scanning, wherein said probe is held at a distance to the substrate surface such as to allow contact at a plurality of intermittent contact moments between the probe tip and the surface during said vibrating of the cantilever; wherein the steps of vibrating of the cantilever and moving of the probe are performed concurrently. The invention is further directed at a scanning probe microscopy system, and to a computer program product for a scanning probe microscopy system.

BACKGROUND

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, AFM may be used for critical defect metrology (CD-metrology), particle scanning, stress- and roughness measurements. AFM microscopy allows visualization of surfaces at very high accuracy, enabling visualization of surface elements at sub-nanometer resolution. Other surface scanning measurement devices for example include optical near field scanning devices.

The probe in an SPM system comprises a cantilever and a probe tip. On one end of the cantilever, the probe is attached to a sensor head, for example (but not necessarily) through an actuator that allows to bring the probe in motion. Probe tip is usually located on the other end of the cantilever. In SPM, the probe tip is scanned over the surface of a sample or substrate to measure the topography and mechanical properties thereof. A sensor, in many cases an optical sensor, monitors the position of the probe tip. For example, the sensor may monitor a reflected laser beam that is reflected by the cantilever or the back of the probe tip, and which changes angle when the probe tip moves up or down.

Depending on the circumstances and the type of information desired, SPM may be performed in various modes of operation. These modes include static modes, wherein the cantilever is held static while the probe tip moves perpendicular to the surface due to surface features that are encountered during scanning. Dynamic operation modes are another important class of modes, wherein the cantilever is vibrated during scanning thereof across the surface. Generally, the topography image of the surface is obtained by measuring the effects of the surface on the probe and keeping it constant by adjusting the height of the probe using a feed back loop and a piezoelectric actuator. The height of the probe is then monitored, and from this, the topography can be obtained. A number of different modes are available and known to the skilled person. For AFM, these modes for example include tapping mode AFM (TM-AFM) wherein the probe is brought intermittently in contact with the surface and which may performed in combination with amplitude modulation AFM (AM-AFM) wherein the amplitude is kept constant, frequency modulation AFM (FM-AFM) wherein the resonance frequency of the probe is kept constant, and peak force tapping mode AFM (PFT-AFM) wherein the probe is moved quasi-statically and maximum deflection is kept constant. In general, it is important to keep the forces constant during the scanning, however it is not possible to measure these forces with the methods applied.

One of the most used AFM operation schemes is Tapping Mode AFM (TM-AFM). In this technique the cantilever is excited with a frequency near its fundamental resonance frequency and brought in intermittent contact with the sample surface until its amplitude decreases to a certain set point amount. While scanning, the amplitude is kept constant by adjusting the distance between the cantilever and the sample. The control signal amplitude error and phase signals are interpreted as the height, amplitude and phase images, respectively. In TM-AFM the tip hits the sample surface in every cycle, and thus experiences both attractive and repulsive forces. However, since these forces occur only during a short fraction of a tapping cycle, the cantilever only responds to the periodic average of the forces. Consequently, the motion of the cantilever remains harmonic and its amplitude and phase evolve only with the periodic average of the forces. Since only the average of the forces affect the cantilever, and countless different types of forces can have the same average, it is impossible to fully estimate the forces from TM-AFM signals.

SUMMARY OF THE INVENTION

It is an object of the present invention to enable measurement of the forces between a probe tip and a surface of a substrate in a scanning probe microscopy method.

To this end, in accordance with a first aspect, there is provided herewith a method of performing surface measurements on a surface of a sample using a scanning probe microscopy system as defined in the claims. Moreover, there is provided a scanning probe microscopy system as defined in the claims; and additionally, a computer program product downloadable from a communication network and/or stored on a computer-readable and/or microprocessor-executable medium, comprising program code instructions that, when executed by a scanning probe microscopy system including a processor, causes the system to perform a method according to any of the claims.

In particular, there is provided herewith a method of performing surface measurements on a surface of a sample using a scanning probe microscopy system, the system comprising a sample support structure for supporting a sample, a sensor head including a probe comprising a cantilever and a probe tip arranged on the cantilever, and an actuator for scanning the probe tip relative to the substrate surface for mapping of the nanostructures, the method comprising the steps of: vibrating the cantilever using an actuator; moving the probe relative to the substrate surface for performing said scanning, wherein said probe is held at a distance to the substrate surface such as to allow contact at multiple contact moments between the probe tip and the surface during said vibrating of the cantilever; wherein the steps of vibrating of the cantilever and moving of the probe are performed concurrently, and wherein for performing the surface measurements, the method comprises: obtaining, using a sensor, a sensor signal indicative of a position of the probe tip during said scanning; and analyzing, using a processor, said sensor signal by quantifying two or more frequency components in a Fourier transform of said sensor signal for determining an estimate of a force value of a force between said substrate surface and said probe tip during said contact moments.

The method of the present invention captures two or more frequency components from the sensor signal that is indicative of the probe tip position, in order to obtain therefrom more information regarding tip-sample interactions. This is used to estimate the force between the tip and the surface of the sample during the contact moments wherein the probe tip is momentarily in contact with the surface during each cycle. In principle, two frequency components corresponding e.g. to the base (or excitation or primary) frequency and one of the harmonics thereof, already provide sufficient information for providing a force estimate that is much more accurate than the periodic average obtained from conventional measurements techniques. However, as will be appreciated, the accuracy may be greatly improved by adding more frequency components, e.g. that relate to other harmonics of the base (or excitation or primary) frequency.

Any frequency components that provide a strong enough signal that exceeds a noise level at that frequency may be used for obtaining the desired information and providing the force estimate. However, as may be appreciated, strong signals may be obtained for frequency components at the ground frequency (e.g. f) and any harmonic modes thereof, including both super-harmonic (e.g. n·f, where n∈ $N$ ) and sub-harmonic modes (e.g. f/n, where n∈ $N$ ).

The desired frequency components may be obtained with a regular type of probe used for AFM or SPM. However, preferably a probe may be used having a cantilever that provides strong harmonic mode frequency components, i.e. in which the motion of the cantilever consists of sub- or super-harmonic frequency components. Such probes are hereinafter sometimes referred to as 'wide-band probes'. Whenever the term 'wide band probe' is mentioned hereinafter, probes are meant that do provide sufficiently strong harmonic modes when excited. Some of these probes even provide many harmonic modes, making them particularly suitable for the present invention such as to enable providing a very accurate force estimation of the tip-sample force. The wide-band probes might have different embodiment and provide different output signals, however, they share a common dynamic setting. They have one or more additional resonator(s) in the dynamics of the probe in order to gather some of the other frequency components of the tip-sample interactions. For example, some probes provide a torsion mode of the cantilever as an auxiliary resonator (e.g. torsional harmonic probes), some probes use a smaller cantilever with an interferometric sensor, some probes may apply a secondary cantilever with a separate optical sensing setup, and yet other probes may use a second bending mode of the cantilever itself as a secondary oscillator to manipulate the motion pattern of tip and reduce the maximum repulsive tip-sample force.

Also sub-resonant modes (e.g. jumping mode, pulsed force mode, peak force tapping mode) fit in a same category as wide band probes. In these modes, a significant amount of frequency components of the forces are lower than the resonance frequency of the cantilever, thus they pass from static band of the cantilever which introduce sub-harmonic deflection signals. In sub-resonance modes, when the operation frequency is significantly lower than the resonance frequency of the cantilever, the deflection signal represents the tip-sample interactions. However, when it exceeds a certain amount (i.e. the quality factor times smaller than fundamental resonance frequency), the cantilever resonates and the output signal significantly deviates from tip-sample interactions. This frequency limit usually restricts the imaging speed in these modes.

The present invention, in accordance with some preferred embodiments, efficiently applies a recursive filter to obtain the estimate of the tip-sample force in a fast and accurate manner. In accordance with some particular embodiments, said analyzing comprises applying a recursive filter for estimating an internal state of the probe from the sensor signal, and using the estimated internal state for determining the estimate of the force value. Recursive filters provide a elegant manner to apply the digital signal processing method for providing such estimates. In order to measure the tip-sample interactions, a mathematical approach should be used that considers the dynamic properties of the cantilever and guarantees a stable minimal error in the estimation. In other words, the error between the estimated force and the real force preferably should approach zero with an exponential speed and should be independent of the forces and displacements, instead it should be only dependent on the measurement noise and uncertainties. A recursive filter is therefore suitable as a digital signal processing method.

In particular, the application of a recursive filter enables to accurately model the dynamics of the system—including harmonic modes—in the applied filter components of the digital filter. As a result, proper dimensioning of the digital filter enables an accurate real-time estimate of the force. The latency of the filter is small enough to be responsive at a time scale of motion of the cantilever, thereby allowing real-time force estimation. The method of the invention, based on applying a recursive filter (such as a Kalman filter), allows force estimation including accurate phase modelling in the harmonics. Thus phase distortions, which may otherwise only be corrected for retrospectively, are virtually absent using a properly dimensioned recursive filter. The absence of such distortions, which could otherwise destabilize a closed-loop application, render application in a closed loop system possible in the present invention. However, the invention is not limited to such a closed-loop application, but may also be applied in an open system providing a real-time force estimate.

In particular, in accordance with some preferred embodiments, the recursive filter is a Kalman filter, wherein the recursive filter further includes a dynamic state model for modelling an influence of the force between the substrate surface and the probe tip on said internal state of the probe. These embodiments apply a regularized type of Kalman estimator, which gives a general solution for nanomechanical force estimation problem in TM-AFM using any of the wide-band probes (including sub-resonant modes). Kalman filters are the optimum algorithm of combining the uncertain and noisy information from different sources. The estimation achieved by a Kalman filter is the optimum estimate, in a sense that the mean value for the error is zero and uncertainty of the estimated value is less than uncertainty of any of the information used for that estimation.

The estimation method applied in these embodiments is computationally inexpensive, easily real-time implemented, robust and captures all of the information which is statistically relevant (guarantees no information loss). Depending on the embodiment of the wide band probe and relative noise levels, the estimated force via the presented method consistently approaches the real amount of tip-sample interactions.

Although the above embodiments apply a recursive filter, and for some specific embodiments a Kalman filter, it must be understood that such filters can be mimicked or estimated by applying one or more alternative digital filters. In those cases, although each of the digital filters may not resemble or be recognizable as a recursive filter or Kalman filter, their combined result will be the same. In some cases this may be proven mathematically. However, for reasons of efficiency and simplicity, such proof is not provided here. It must be understood, though, that such implementations fall within the interpretation of the term 'recursive filter' as used in the present teaching, and hence do fall within the scope of the claimed invention.

In accordance with particular embodiments, for determining the force value during said contact moments, the recursive filter applies the following augmented system state model for including said internal state of the probe and said dynamic state model:

$$\begin{pmatrix} x_{k+1} \\ p_{k+1} \end{pmatrix} = \underbrace{\begin{bmatrix} A & B\hat{C} \\ O & \hat{A} \end{bmatrix}}_{\mathcal{A}} \begin{pmatrix} x_k \\ p_k \end{pmatrix} + \underbrace{\begin{bmatrix} B_2 \\ O \end{bmatrix}}_{\mathcal{B}} f_k^d + \begin{pmatrix} \omega_k \\ \hat{\omega}_k \end{pmatrix}$$

$$\begin{pmatrix} y_k \\ O_{N\times 1} \end{pmatrix} = \underbrace{\begin{bmatrix} C & D_1\hat{C} \\ O & \hat{C}^{(2)} \end{bmatrix}}_{\mathcal{C}} \begin{pmatrix} x_k \\ p_k \end{pmatrix} + \underbrace{\begin{bmatrix} D_2 \\ O \end{bmatrix}}_{\mathcal{D}} f_k^d + \begin{pmatrix} v_k \\ \hat{v}_k \end{pmatrix},$$

$$f_k^{ts} = \begin{bmatrix} O_{1\times n} & \hat{C} \end{bmatrix} \begin{pmatrix} x_k \\ p_k \end{pmatrix}$$

wherein: $x_k$ is an internal state of the system at contact moment k; $x_{k+1}$ is an internal state of the system at contact moment k+1 subsequent to contact moment k; $p_k$ is a dynamic state of the influence of the force between the probe tip and the substrate surface at contact moment k; $p_{k+1}$ is a dynamic state of the influence of the force between the probe tip and the substrate surface at contact moment k+1; $v_k$, $\hat{v}_k$, $\omega_k$ and $\hat{\omega}_k$ represent noise factors; $f_k^d$ represents a dithering signal to the internal state; $f_k^{ts}$ represents the force value of the force between the probe tip and the substrate surface; A is the state matrix of the system; $B_1$ and $B_2$ are the input matrices for respectively force value of the force between the probe tip and the substrate surface and the dithering signal; $D_1$ and $D_2$ are the feed forward matrices for respectively force value of the force between the probe tip and the substrate surface and the dithering signal; O is the null-matrix; C is the output matrix; $\hat{A}$ and $\hat{C}$ are respectively the dynamic state matrix and the dynamic output matrix of the dynamic state model for modelling the influence of the force between the substrate surface and the probe tip on said internal state of the probe; and $\hat{C}^{(2)}$ is the output matrix of a Tikhonov type regularization rule. The above embodiments apply a specific implementation of the regularized Kalman filter described hereinabove. A full description of this digital signal processing method is provided in this document further below.

The input matrix $\hat{A}$ and the output matrix $\hat{C}$ of the dynamic state model, as well as the output matrix of the Tikhonov type regularization rule described hereinabove, may for example be taken as follows, in accordance with some embodiments. In these embodiments, the following is applied:

$$\hat{A} = I_{N\times N} \otimes \begin{bmatrix} 1 & 0 & 0 \\ 1 & 0 & 0 \\ 0 & 1 & 0 \end{bmatrix};$$

$$\hat{C} = 1_{1\times N} \otimes [1 \ 0 \ 0];$$

and $$\hat{C}^{(2)} = \begin{bmatrix} 1, & \frac{\Omega^2}{\Omega_f^2} - 2, & 1, & & & O_{1\times 3(N-1)} \\ O_{1\times 3}, & 1, & \frac{(2\Omega)^2}{\Omega_f^2} - 2, & 1, & & O_{1\times 3(N-2)} \\ O_{1\times 6}, & 1, & \frac{(3\Omega)^2}{\Omega_f^2} - 2, & 1, & & O_{1\times 3(N-3)} \\ & & & \ddots & & \\ O_{1\times 3(N-1)}, & & 1, & \frac{(N\Omega)^2}{\Omega_f^2} - 2, & 1 \end{bmatrix};$$

wherein $\Omega$ and $\Omega_f$ are respectively the resonance frequency of the probe and the sampling frequency of the sensor signal.

In accordance with some embodiments, the method further comprises receiving, during initializing of the system for performing the step of analyzing, an indication of a number of frequency components in the Fourier transform of the sensor signal which provide a signal strength that is larger than a noise level. To allow most optimal analysis, taking into account as many as desired frequency components, the number of components that provide a good enough signal-to-noise ratio (SNR) may be estimated and used as input to the analysis of the received sensor signal. Preferably, only components having a strong enough SNR, e.g. above 5 dB or 10 dB, preferably above 20 dB, more preferably above 30 dB, may be taken along during analysis. As will be appreciated, the choice of which frequency components to use in the process is up to the skilled person applying the method, and the above criteria may thus be dispensed with dependent on the circumstances without departing from the present invention.

The analysis itself may comprise, in accordance with embodiments of the invention, the steps of: calculating an a priori estimate of the internal state of the probe; calculating an a priori error estimate; calculate a Kalman gain matrix; calculate an a posteriori estimate of the internal state based on the Kalman gain matrix, the sensor signal, and the a priori estimate of the internal state of the probe; calculate an a posteriori error estimate based on the a priori error and the Kalman gain matrix; and calculate, using the a posteriori estimate of the internal state, the estimated force value of the force between said substrate surface and said probe tip during said contact moments.

In accordance with some embodiments, the method may further comprise providing an output signal indicative of the estimated force value of the force between the substrate surface and the probe tip during said periodic contact moments. The method, in accordance with these embodiments, is used for direct force measurement, e.g. useable for analysis of material properties of a surface.

In accordance with some embodiments, the method may further comprise: obtaining a predefined reference force value; comparing the determined estimated force value with the predefined reference force value for obtaining a difference value; and providing a feedback signal to the sensor head such as to adapt the distance between the probe and the substrate surface for minimizing the difference value. This allows to use the estimated forces in an indirect method of e.g. mapping the surface topography by adjusting the height of the probe tip above the surface dependent on the force. In such embodiments, the system may further comprise a distance sensor for determining a distance between the probe and the substrate support structure in a direction perpendicular to the substrate surface, wherein the method comprises obtaining a distance signal from the distance sensor and using the distance signal for providing topology information of the substrate surface. The distance sensor may be a hardware sensor unit that performs this task, or may be a computer implemented process that keeps track of the distance adjustments that are performed.

The probes that are considered suitable for applying the method of the present invention have been discussed hereinabove. In principle these could be regular probes as far as these allow to obtain a sensor signal having strong enough frequency components of the signal above or below the ground excitation frequency, preferably at super-harmonic or sub-harmonic modes. In accordance with embodiments of the invention, the probe comprises a cantilever having a shape and dimensions such as to comprise at least one of: one or more harmonic modes at a frequency being a integer multiple of a ground resonance frequency of the cantilever; or one or more sub-harmonic modes at a frequency being an inverse integer multiple of a ground resonance frequency of the cantilever, wherein the inverse integer is equal to 1/n and wherein n is an integer. Such may include, in accordance with some embodiments, probes that are elements of a group comprising linear probes, harmonic probes comprising two or more resonance frequencies, interferometric force sensing probes, dynamic compliant probes.

In accordance with a second aspect, the invention provides a scanning probe microscopy system comprising a sample support structure for supporting a sample, a sensor head including a probe comprising a cantilever and a probe tip arranged on the cantilever, and an actuator for scanning the probe tip relative to the substrate surface for mapping of the nanostructures, wherein the sensor head comprises a vibration actuator for vibrating the cantilever of the probe during scanning, and sensor unit for obtaining a sensor signal indicative of a position of the probe tip during scanning; wherein the system further comprises a processor configured for applying a method as defined in any of the previous claims, in particular arranged for analyzing said sensor signal by quantifying two or more frequency components in a Fourier transform of said sensor signal for determining an estimate of a force value of a force between said substrate surface and said probe tip during said contact moments, wherein said analyzing comprises applying a recursive filter for estimating an internal state of the probe from the sensor signal, and using the estimated internal state for determining the estimate of the force value.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIGS. 2a to 2c schematically illustrates a method of the invention wherein a force estimate is used in a feedback system to adjust the height of a probe for mapping surface topography;

DETAILED DESCRIPTION

Figure 1:
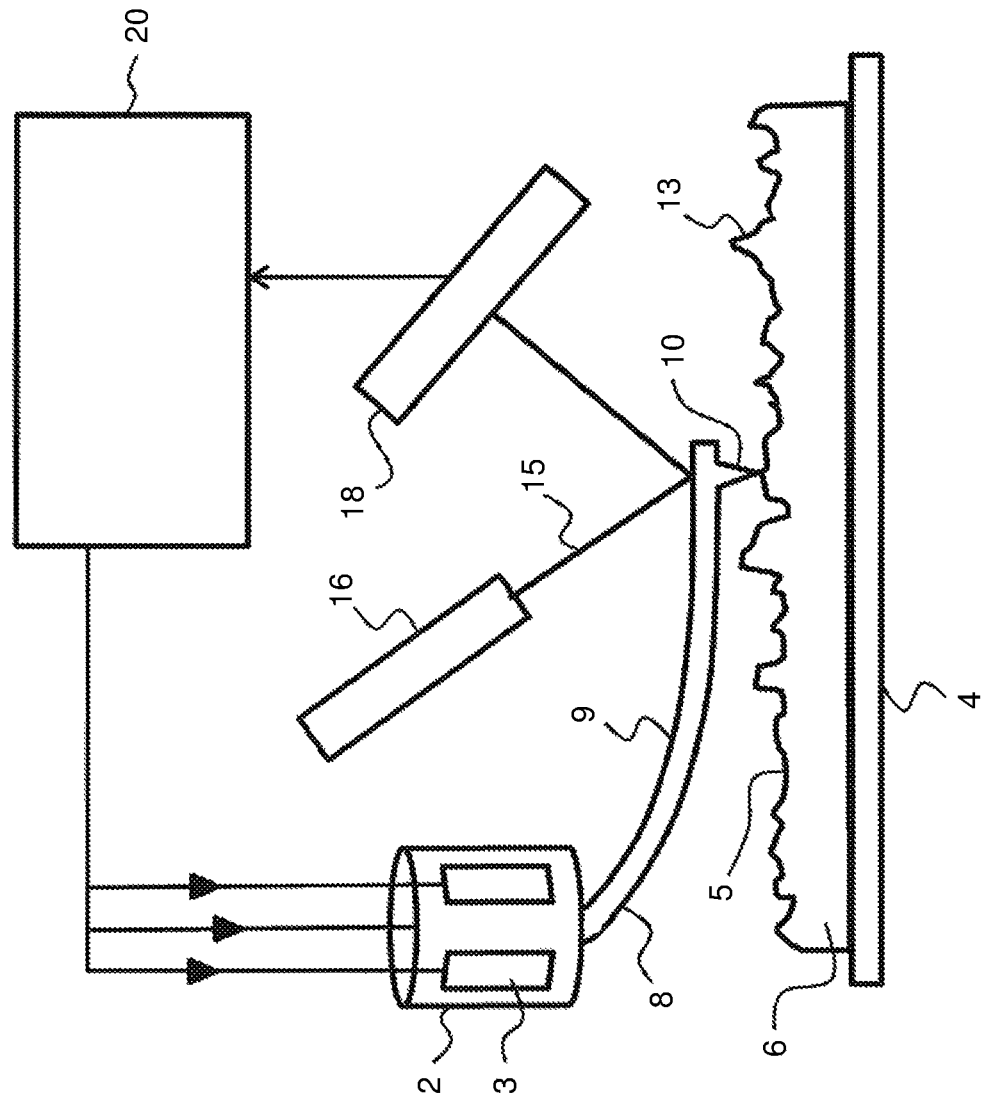
FIG. 1 schematically illustrates an atomic force microscope.

FIG. 1 schematically illustrates the working principle of a typical prior art atomic force microscope. In FIG. 1, a probe head 2 comprises piezo type drivers 3 for the X-, Y-, and Z-directional motion of a probe 8. The probe 8 consists of a cantilever 9 having a probe tip 10 arranged for scanning a sample surface 5 of a sample 6. During scanning, a dither piezo (not shown) or other means of actuations such as photo-thermal actuation, electrostatic, etc, may drive the cantilever in vibrational mode (for example close to resonant frequency) to enable tapping of the probe tip on the surface. The manner of applying a vibrational motion to the probe tip is known to the skilled person.

Scanning of the sample surface 5 is performed by moving the probe tip 10 in the X- and Y direction parallel to the sample surface 5 (or alternatively, by moving the substrate surface in the X- and Y-directions while maintaining the position of the probe tip fixed in the X- and Y-directions). The probe tip 10 is brought in close proximity to the surface 5 by means of a z-directional piezo driver. Once in the position, the probe tip 10 is vibrated in the z-direction such that it repeatedly touches the surface 5 during scanning thereof. At the same time, a laser 16 illuminates the probe tip with laser beam 15. The precise position in the z-direction is determined using photo diodes 18 which receive the reflected laser beam 15.

The sample surface 5 is carried using a sample carrier 4. Driving of the piezo drivers 3 located on the probe head 2 is performed using the detector and feedback electronics 20. At the same time, the detector and feedback electronics 20 receive the detected z position as determined using photo diodes 18. This principle allows for very precise mapping of surface elements, such as surface element 13 on the surface 5 of the sample 6. Atomic force microscopy performed e.g. using a technique as illustrated in FIG. 1 allows the mapping of very small structures and features on the surface, e.g. nanostructures having typical nanometer dimensions (e.g. even <1 nm, such as for example individual polymer strings being as thin as 0.4 nm). As described herein above, since the mapping of the surface has to be performed with great precision, the speed at which the method is performed is rather slow. The present invention, however, is not limited to atomic force microscopy, but may also be applied in combination with other scanning probe microscopy methods.

The analysis method applied in accordance with the invention applies a regularized Kalman filter, as digital signal processing method. The mathematics applied are based on the principles below.

We begin with a state space representation of the probe as a linear resonator. Any of the wide-band probes (or the normal cantilever in sub-resonance methods) can be described with an n degrees of freedom discrete time linear model as:

$$x_{k+1} = Ax_k + B_1 f_k^{ts} + B_2 f_k^d + \omega_k$$

$$y_k = Cx_k + D_1 f_k^{ts} + D_2 f_k^d + v_k \quad (1)$$

where k is the time step, n is twice the number of vibration modes, $A \in \mathbb{R}^{n \times n}$ is the dynamic process matrix of the system, $B_1$ and $B_2 \in \mathbb{R}^{n \times 1}$ are the input matrices that transfer the effects of tip-sample interactions $f^{ts}$ and dithering signal $f^d$ to the state vector $x_k \in \mathbb{R}^{n \times 1}$ respectively. The output signals are gathered in $y_k \in \mathbb{R}^{r \times 1}$, which is a linear combination of the states with weight of $C \in \mathbb{R}^{r \times n}$ and the tip-sample interactions and dither signals are fed through via weights $D_1$ and $D_2 \in \mathbb{R}^{r \times 1}$ respectively. The noise $\omega_k \in \mathbb{R}^{n \times 1}$ and $v_k \in \mathbb{R}^{r \times 1}$ represent the model uncertainty (or process noise) and measurement noise (error) respectively, and are assumed to be uncorrelated zero-mean Gaussian processes.

In Eq. (1) only one of the inputs and the output(s) are known, (i.e., $f^{ts}$ is unknown) thus the problem of force estimation in TM-AFM can be considered as a simultaneous unknown input and state estimation problem of a linear system. There are some methods for designing such observers which can estimate the observable states correctly with a finite delay[19]. However, the problem of input estimation for mechanical systems is ill conditioned, meaning that in the presence of any noise, the estimated value for the input diverges.

A. Transforming the Input Estimation to State Estimation

In order to eliminate the ill-conditioning problem we first convert the input estimation problem to a state estimation problem by assuming a dynamic model for the tip-sample interactions in the artificial system as in Eq. (2)

$$p_{k+1} = \hat{A} p_k + \hat{\omega}_k$$

$$f_k^{ts} = \hat{C} p_k \quad (2)$$

in Eq. (2) the random walk $\hat{\omega}_k$ shapes the artificial state p which forms the tip-sample interactions via an artificial measurement matrix $\hat{C}$. The matrices $\hat{A}$ and $\hat{C}$ are to be designed in the next section. Considering the augmented state vector as $[x_k^T \, p_k^T]^T$ the unknown input system becomes the augmented known-input system in Eq. (3).

$$\begin{pmatrix} x_{k+1} \\ p_{k+1} \end{pmatrix} = \begin{bmatrix} A & B_1 \hat{C} \\ O & \hat{A} \end{bmatrix} \begin{pmatrix} x_k \\ p_k \end{pmatrix} + \begin{bmatrix} B_2 \\ O \end{bmatrix} f_k^d + \begin{pmatrix} \omega_k \\ \hat{\omega}_k \end{pmatrix} \quad (3)$$

$$y_k = \begin{bmatrix} C & D_1 \hat{C} \end{bmatrix} \begin{pmatrix} x_k \\ p_k \end{pmatrix} + D_2 f_k^d + v_k$$

The system in Eq. (3) has known inputs and known outputs. Thus, using a Kalman filter (or any other state observer) it is possible to estimate the states. Consequently, the tip-sample interactions can be found by multiplying the estimated state vector by $[O_{1 \times n} \, \hat{C}]$. However, before designing the observer, the artificial system matrices have to be defined considering the nature of TM-AFM.

B. Regularization

Due to the nature of intermittent contact mode AFM (tapping mode, or the sub-resonance modes) the tip-sample interactions are periodic functions in time domain (or at least to a great extent). On the other hand, the Fourier transform of any periodic function approaches its Fourier series, meaning that it can only contain frequencies that are integer multiples of the frequency of the function (including zero). Thus, it is reasonable to assume that the tip-sample interactions as a time domain signal only contain frequencies that are integer multiples of excitation frequency[7,18].

In order to implement the periodicity assumption in a discrete-time configuration, consider the following finite difference relation on an arbitrary signal s in the time domain with sampling frequency $\Omega_f$:

$$\Omega_f^2 (s_{k+1} - 2s_k + s_{k-1}) + \Omega^2 s_k = \epsilon$$

if the signal s is harmonic with the frequency $\Omega$ then the error $\epsilon$ has to be zero (apart from finite difference truncation error and a round off error). In matrix notation this reads:

$$\begin{bmatrix} 1 & \dfrac{\Omega^2}{\Omega_f^2} - 2 & 1 \end{bmatrix} \begin{pmatrix} s_k \\ s_{k-1} \\ s_{k-2} \end{pmatrix} = \dfrac{\epsilon}{\Omega_f^2} \quad (4)$$

To add this assumption to the artificial system defined in Eq. (2) consider that the wide-band AFM probe has N frequency components in its measured motion signal that are above the noise floor. Then the states of the artificial system can be defined as follows:

$$p_k = [s_k^{(1)} s_{k-1}^{(1)} s_{k-2}^{(1)} s_k^{(2)} s_{k-1}^{(2)} s_{k-2}^{(2)} \ldots s_k^{(N)} s_{k-1}^{(N)} s_{k-2}^{(N)}]^T, \quad (5)$$

where $s^{(i)}$ represents the $i^{th}$ frequency component of the tip-sample force. Thus, the matrices for the artificial system can be defined as:

$$\hat{A} = I_{N \times N} \otimes \begin{bmatrix} 1 & 0 & 0 \\ 1 & 0 & 0 \\ 0 & 1 & 0 \end{bmatrix} \quad \hat{C} = 1_{1 \times N} \otimes [1 \, 0 \, 0] \quad (6)$$

where $\otimes$ is the Kronecker product operator. The definition of the $\hat{A}$ and $\hat{C}$ matrices represents the shift register in Eq. (5) and in order to implement the periodicity assumption in Eq. (4), similar to the Tikhonov method, the regularization rule can be defined as an other artificial measurement of the system as:

$$\hat{y}_k = \hat{C}^{(2)} p_k + \hat{v}_k \quad (7)$$

where $\hat{y}_k=0$, $\forall k>0$ and the artificial noise $\hat{v}_k$ represents the uncertainty and error of the periodicity assumption which is made in this section. In other words, it was assumed that the forces in tapping TM-AFM are periodic, however even this assumption is uncertain ($\hat{v} \neq 0$), in the same way that the dynamic model of the system and the measurement signals are provided but they are uncertain ($\omega \neq 0$, $v \neq 0$ respectively). Considering Eq. (4) the $\hat{C}^{(2)}$ matrix in Eq. (7) is defined as:

$$\hat{C}^{(2)} = \begin{bmatrix} 1, & \frac{\Omega^2}{\Omega_f^2}-2, & 1, & & & O_{1\times 3(N-1)} \\ O_{1\times 3}, & 1, & \frac{(2\Omega)^2}{\Omega_f^2}-2, & 1, & & O_{1\times 3(N-2)} \\ O_{1\times 6}, & & 1, & \frac{(3\Omega)^2}{\Omega_f^2}-2, & 1, & O_{1\times 3(N-3)} \\ & & & \ddots & & \\ O_{1\times 3(N-1)}, & & & 1, & \frac{(N\Omega)^2}{\Omega_f^2}-2, & 1 \end{bmatrix} \quad (8)$$

where $\Omega$ and $\Omega_f$ are the dither piezo excitation frequency and sampling frequency. Considering Eq. (3), and Eq. (7), the problem of estimation of the tip-sample interactions in TM-AFM is converted to the state estimation of the following augmented system.

$$\begin{pmatrix} x_{k+1} \\ p_{k+1} \end{pmatrix} = \underbrace{\begin{bmatrix} A & B\hat{C} \\ O & \hat{A} \end{bmatrix}}_{\overline{A}} \begin{pmatrix} x_k \\ p_k \end{pmatrix} + \underbrace{\begin{bmatrix} B_2 \\ O \end{bmatrix}}_{\overline{B}} f_k^d + \begin{pmatrix} \omega_k \\ \hat{\omega}_k \end{pmatrix} \quad (9)$$

$$\begin{pmatrix} y_k \\ O_{N\times 1} \end{pmatrix} = \underbrace{\begin{bmatrix} C & D_1\hat{C} \\ O & \hat{C}^{(2)} \end{bmatrix}}_{\overline{C}} \begin{pmatrix} x_k \\ p_k \end{pmatrix} + \underbrace{\begin{bmatrix} D_2 \\ O \end{bmatrix}}_{\overline{D}} f_k^d + \begin{pmatrix} v_k \\ \hat{v}_k \end{pmatrix},$$

$$f_k^{ts} = \begin{bmatrix} O_{1\times n} & \hat{C} \end{bmatrix} \begin{pmatrix} x_k \\ p_k \end{pmatrix}$$

It is straightforward to show that the system in Eq. (9) is fully observable and well-posed. Thus, considering a known expected values for the noise covariance matrices as $Q=\mathbb{E}\{[\omega^T \hat{\omega}^T]^T[\omega^T \hat{\omega}^T]\}$ and $R=\mathbb{E}\{[v^T \hat{v}^T]^T[v^T \hat{v}^T]\}$, a Kalman filter can be implemented to estimate its states and consequently the tip-sample interactions. Although the noise co-variance matrices are not completely known, each part of them can be tuned to achieve an optimum performance as follows.

The measurement noise covariance $\mathbb{E}\{v\, v^T\}$ represents the noise in the deflection signal where the cantilever is not moving and can be directly measured.

The process noise $\mathbb{E}\{\omega\, \omega^T\}$ covers the thermo-noise and any uncertainty in the mechanical properties of the cantilever which depends accuracy of calibration of cantilever etc.

The uncertainty in the periodicity assumption is represented by $\mathbb{E}\{\hat{v}\, \hat{v}^T\}$) that allows for estimation of tip-sample interactions in transient situations. This parameter can be tuned for a trade off between noise in the output and coverage of the transient situations.

The process noise of artificial part of the system $\mathbb{E}\{\hat{\omega}\, \hat{\omega}^T\}$, represents the step size of the random walk which influences the convergence speed.

Similar to the Tikhonov method, the trade off between accuracy and noise can be performed manually. In this paper all of the noise covariance matrices are assumed to be identity matrix scaled with a small numbers. Note that choosing wrong noise statistics for the Kalman filter does not lead to wrong estimate of the forces as in other filters, but it leads to a noisy estimate or a slower convergence.

C. Step-by-Step Implementation

All the calculation steps of the regularized Kalman filter for any of the wide baud probes can be briefly expressed as follows:

Only Once:

Step1: Either model or identify the dynamic model of the probe in state space form, transform it to discrete time form to find the coefficient matrices Eq. (3).

Step2: Based on the frequency spectrum of the measurement signal, decide about number N (the number of frequency components above the noise level). This is the number of frequency components in the motion of the cantilever that are above the noise level.

Step3: Calculate the coefficient matrices $\hat{A}$, $\hat{C}$, and $^2\hat{C}$ from Eq. (6) and Eq. (8).

Step4: Generate the augmented system model as in Eq. (9).

Step5: Choose an appropriate set of noise co-variance matrices Q and R, initial value and $\ddot{x}_{0|0}$ co-variance $\Sigma_{0|0}$.

In Every Sampling Time k:

Step1: Calculate the primary estimate as:

$$\ddot{x}_{k+1|k} = \overline{A}\ddot{x}_{k|k} + \overline{B}f_k^d,$$

Step2: Calculate the prior error convenience matrix as:

$$\Sigma_{k+1|k} = \overline{A}\Sigma_{k|k}\overline{A}^T + Q,$$

Step3: Calculate the Kalman gain as:

$$K_k = \Sigma_{k+1|k}\overline{C}^T(\overline{C}\Sigma_{k+1|k}\overline{C}^T + R)^{-1}$$

Step4: Calculate the posterior state estimate as:

$$\overline{x}_{k+1|k+1} = \overline{x}_{k+1|k} + K_k(\overline{y} - \overline{C}x_{k+1|k} - \overline{D}f_k^d)$$

Step5: Calculate the posterior error convenience matrix as:

$$\Sigma_{k+1|k+1} = (I - k_k\overline{C})\Sigma_{k+1|k}$$

Step6: Calculate the tip-sample force as:

$$\hat{f}_k^{ts} = [O_{1\times n}\hat{C}]\overline{x}_{k+1|k+1};$$

FIG. 2A schematically illustrates a method of the present invention. In FIG. 2A, the probe 8 is schematically illustrated in three positions 8, 8' and 8''. The probe 8 is scanned relative to the surface 5 in the direction illustrated by the arrow 22. The distance Z relative to a distance sensor 25 in the direction perpendicular to the surface 5 can be monitored for providing a mapping of the topography of the surface. The distance sensor 5 may be attached or fixed to a metrology frame of the scanning probe microscopy system.

The probe 8 in each position 8, 8' and 8'' is illustrated to vibrate, and its subsequent upper and lower extreme positions are illustrated in FIG. 2A. During vibration, the probe 8 intermittently is in contact with the surface 5. During such contact moments, the probe 8 experiences a force present between the probe tip 9 and the substrate surface 5. This is schematically illustrated in the enlargement of position 8'' in FIG. 2B. FIG. 2B illustrates the vibrational movements 26 of the probe tip 9 schematically. The probe tip 9 in its lower position touches the substrate surface 5, experiencing a Van der Waals force 28. The present invention allows to estimate the Van der Waals force 25 very accurately by taking the Fourier transform of the optical sensor signal obtained with photodiode sensor 18. In accordance with the present invention this force estimate of the force 28 is compared with a reference force that may be set prior to the scanning. The difference between the force 28 and the reference force may be provided to a feedback system (e.g. controller 56 in FIG. 4) that adjusts the height of the probe 8 such as to hold the estimated force value of the force 28 constant. As illustrated in FIG. 2A, this causes the height of the probe 8 to be adjusted dependent on surface structures 30 encountered during scanning (path 22). By monitoring the height of the probe above the surface using the distance sensor 25, the height differences h can be determined, allowing accurate mapping of the topography of the surface 5. As is illustrated in FIG. 2C, the probe tip 9 may be moved in parallel paths 22-1, 22-2, 22-3, . . . 22-n (not shown) such as to allow mapping of (a part of) the surface of the sample.

Figure 3:
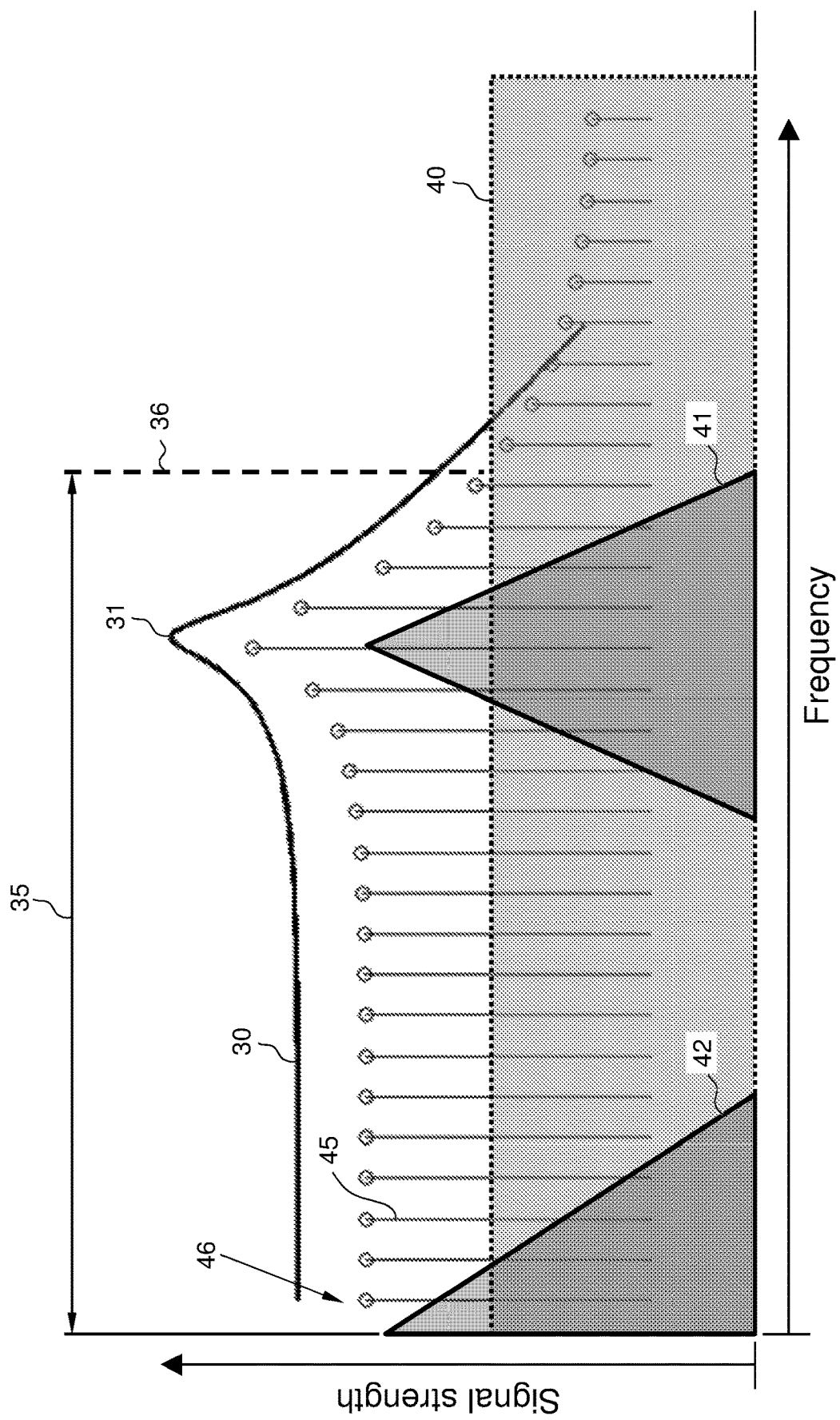
FIG. 3 illustrates frequency components obtainable from a Fourier transform of a sensor signal, useable in the present invention.

FIG. 3 schematically illustrates the sensibility of a typical wide band probe as a function of the frequency. On the vertical axis the signal strength is schematically illustrated, and the horizontal axis provides the frequency. The probe's frequency response function (FRF) is illustrated by the function 30. Clearly, point 31 on the line 30 corresponds with the resonance frequency of the probe. The sensing bandwidth is more or less the area indicated by 35. Above the upper frequency 36 of the sensing bandwidth, the signal strength of the probe becomes too low to be distinguished with sufficient accuracy from the noise level. The grey level 40 illustrates the noise level of white noise. The schematically illustrated triangular area 41 represents the thermal noise of the cantilever, which concentrates around the resonance frequency 31. At the lower end of the spectrum, the area 42 represents pink noise or 1/f noise. Suppose the wide band probe is excited with an excitation frequency indicated by the first frequency component 46 in FIG. 3. Taking the fast Fourier transform (FFT) of the sensor signal from the photodiode sensor 18, the frequency components such as 45 illustrate the super harmonic modes of the excitation frequency 46. As follows from the schematic FIG. 3, including the excitation frequency 46, a total of twenty-one frequency components 45 are above the noise level 40 and may be used in the digital signal processing method of the invention for analyzing and force estimation.

Figure 4:
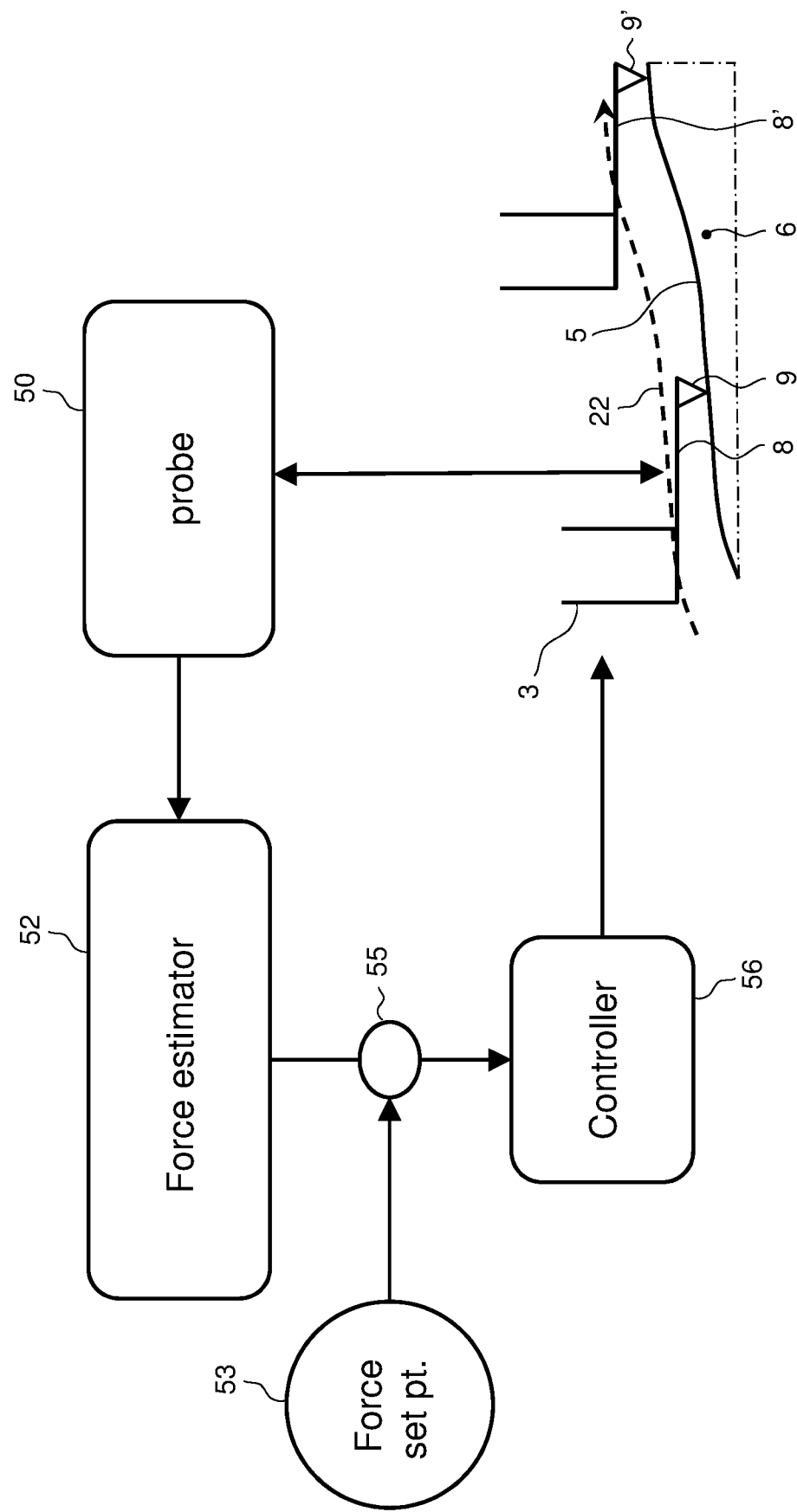
FIG. 4 illustrates a method of the present invention.

The method of the present invention is schematically illustrated in FIG. 4. The probe 8 follows the probe path 22 across the surface 5 of the sample while being vibrated using a piezo actuator 3. The position of the probe tip is monitored using photodiode sensor 18 on the sensor head, as is schematically illustrated by step 50. The sensor signal received in step 50 contains the frequency components that provide a strong enough signal to be analyzed during the force estimation and are usable as input to the system as explained herein above. Prior to sensing, the system preferably has received an indication of the number of frequency components that may be useable. The sensor signal taken at step 50 is analyzed using digital signal processing in step 52 for performing said force estimation. Dependent on the number of frequency components contributing to the force estimation, the digital signal processing method 52 provides an accurate estimate of the tip-sample force 28 during contact moments of the probe tip with the surface service 5. This estimated force value is compared with a pre-set force value received in step 53. The comparison is schematically illustrated by step 55. Then in step 56, a controller, dependent on the difference between the set reference force value and the estimated force value adjusts the height of the probe 8, thereby adjusting its path 22.

Figure 5:
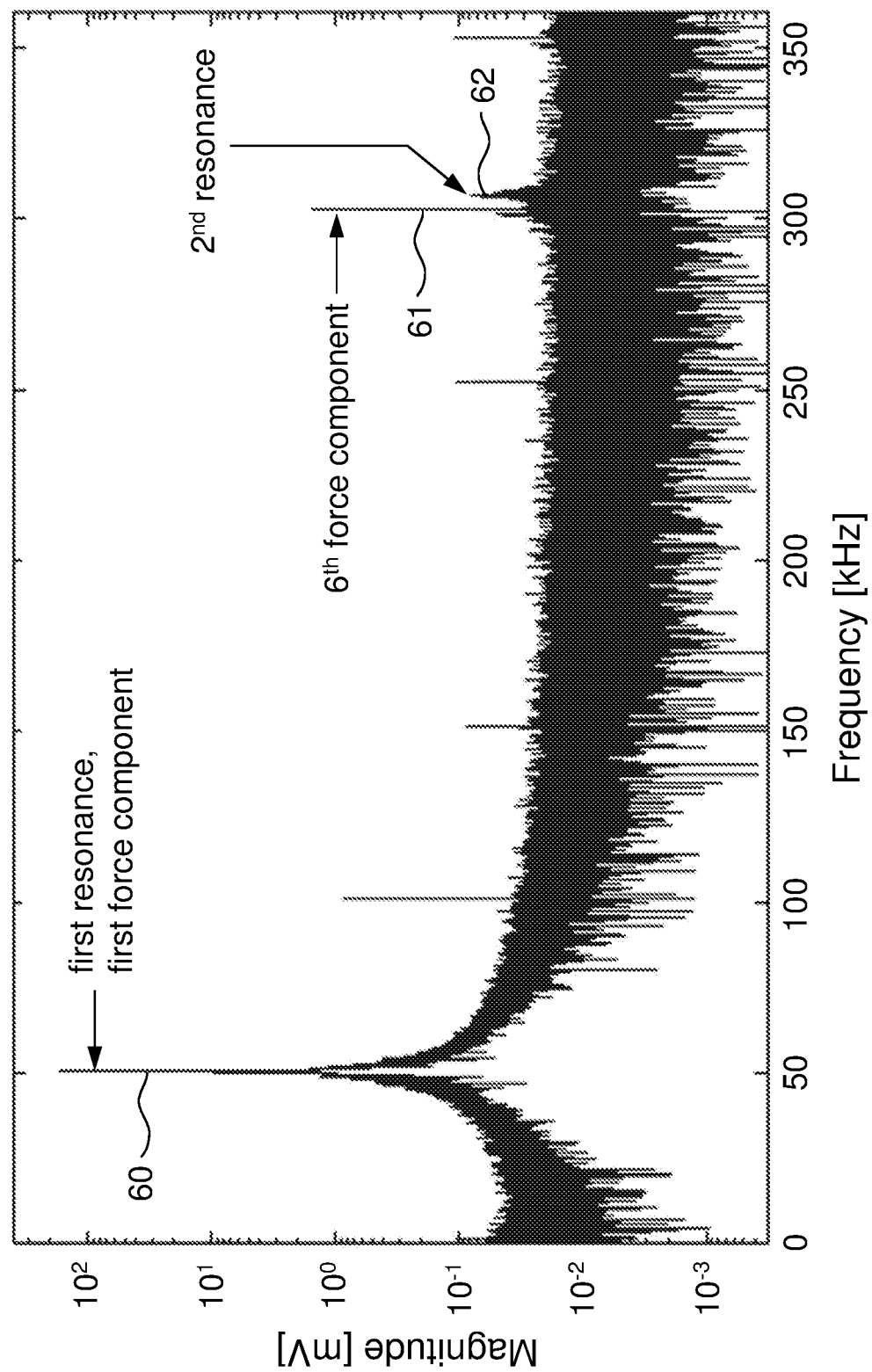
FIG. 5 illustrates a Fourier transform of a sensor signal, indicating useable signals of a harmonic mode of the excitation frequency.
Figure 6:
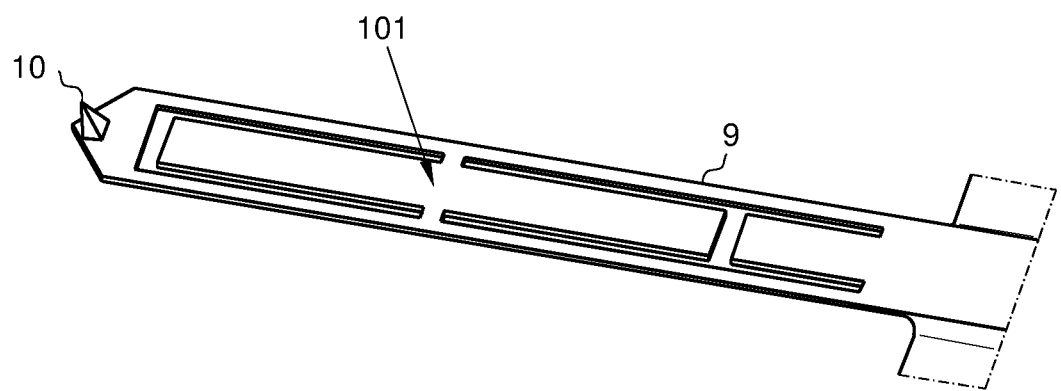
FIG. 6 schematically illustrates a probe that is useable in an embodiment of the invention.

FIG. 5 schematically illustrates a Fourier transform of a sensor signal obtained with AFM using a probe that has been specifically designed with a sensitivity to the ground frequency (here equal to the resonance frequency 60 of the probe), and to the frequency range around the sixth super harmonic mode of the ground frequency 61. In particular, the probe is sensitive to a frequency of 6.07 times the resonance frequency, thereby allowing the probe to accurately receive a signal of the sixth super harmonic mode 61 of the ground frequency 60. The ground frequency 60 is at 50 kHz and the sixth harmonic mode thereof is therefor located at 300 kHz. The probe is sensitive to approximately 303 kHz, thereby also allowing sensing of the sixth harmonic mode 61.

FIGS. 6 through 12 provide various embodiments of cantilevers of probes that allow to measure sub- and super harmonic modes of a ground excitation frequency e.g. by having a wide sensing bandwidth ("wide band probes"). The first wide band probe 6 comprises a probe tip 10 and a cantilever 9. The cantilever 9 comprises a paddle 101 having its own typical resonance frequency thereby adding one or more additional modes to the probe.

Figure 7:
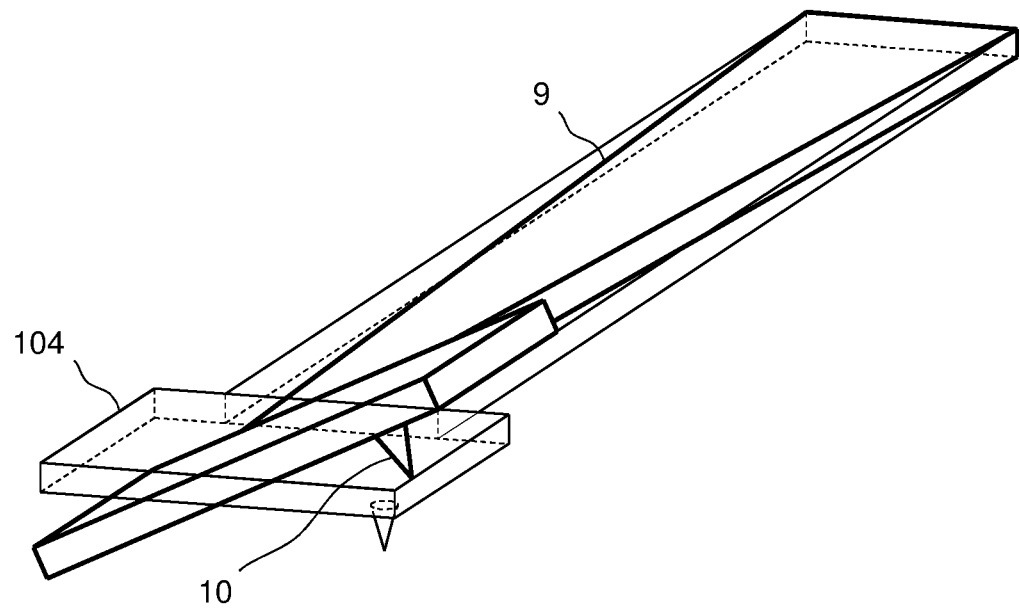
FIG. 7 schematically illustrates a probe that is useable in an embodiment of the invention.

In the probe illustrated in FIG. 7, the probe tip 10 is located on the side of a T-shaped extension at the end of the cantilever 9. Vibrating the probe against the substrate surface 5 provides the probe with a torsion component having its own frequency characteristics in addition to the linear vibration mode. Therefore, the sensing frequency band of the probe of FIG. 7 is increased, thereby making this probe particularly suitable for use in an embodiment of the present invention.

Figure 8:
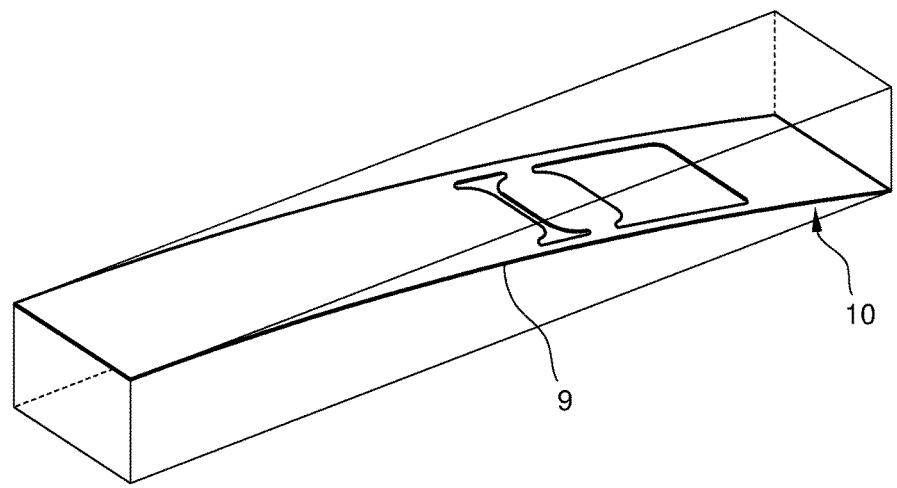
FIG. 8 schematically illustrates a probe that is useable in an embodiment of the invention.

In FIG. 8, the cantilever 9 comprises a middle section which has been cut out, providing room for a paddle-like construction. Again, FIG. 8 is an example of a wide band type probe similar to the probe of FIG. 6.

Figure 9:
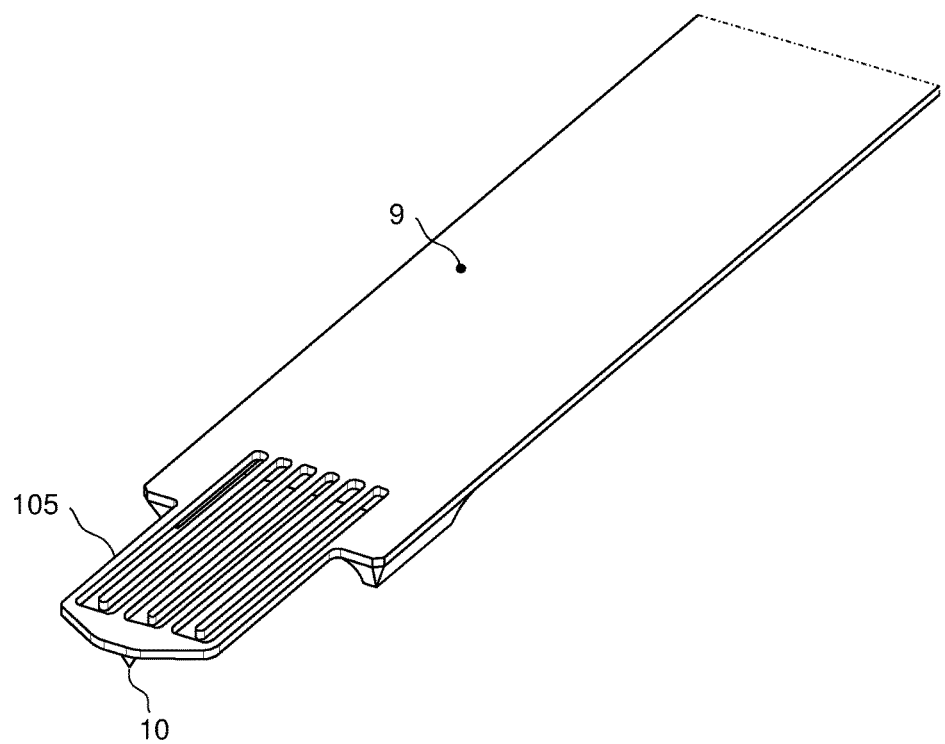
FIG. 9 is a scanning electron microscope (SEM) image of a probe that is useable in an embodiment of the invention.

FIG. 9 is a photograph of an introferromatic force sensing probe having a cantilever 9 and a probe tip 10. In the section 105 at the end of the cantilever 9, between the cantilever 9 and the probe tip 10, the particular shaped section 105 provides for additional harmonic modes, making the probe suitable for use in the present invention.

Figure 10:
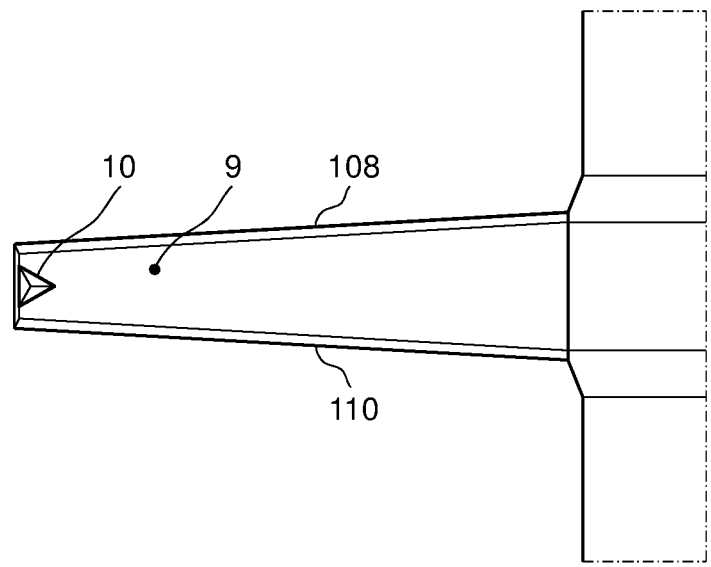
FIG. 10 is a scanning electron microscope (SEM) image of a probe that is useable in an embodiment of the invention.

In the probe illustrated in FIG. 10, the sides 108 and 110 of the cantilever 9 have been tapered such as to modify the frequency response function of the probe in order to make it sensitive to the sixth harmonic mode of the excitation frequency (which excitation frequency in use coincides with the resonancy of the probe). The probe illustrated in FIG. 10 clearly shows the tapered sides 108-110. The probe of FIG. 10 has been used in order to obtain the sensor signal illustrated in FIG. 5.

Figure 11:
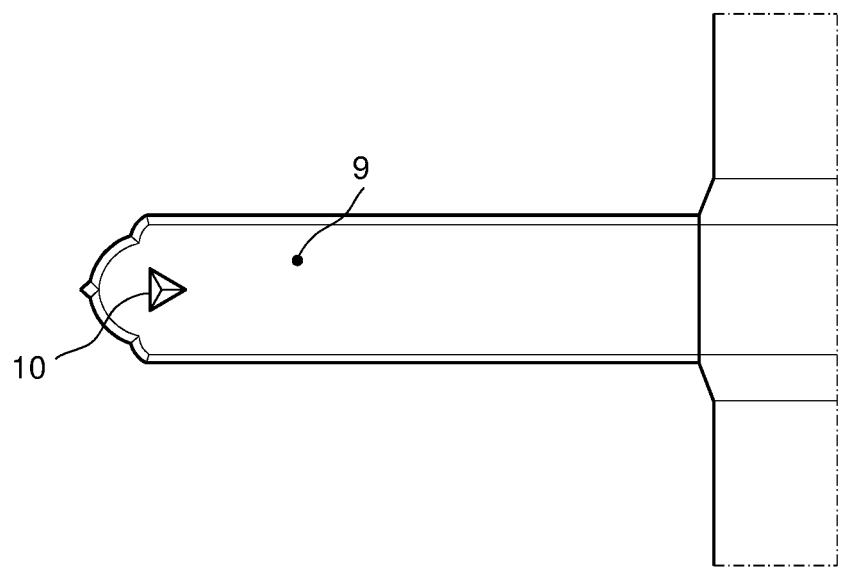
FIG. 11 is a scanning electron microscope (SEM) image of a probe that is useable in an embodiment of the invention.
Figure 12:
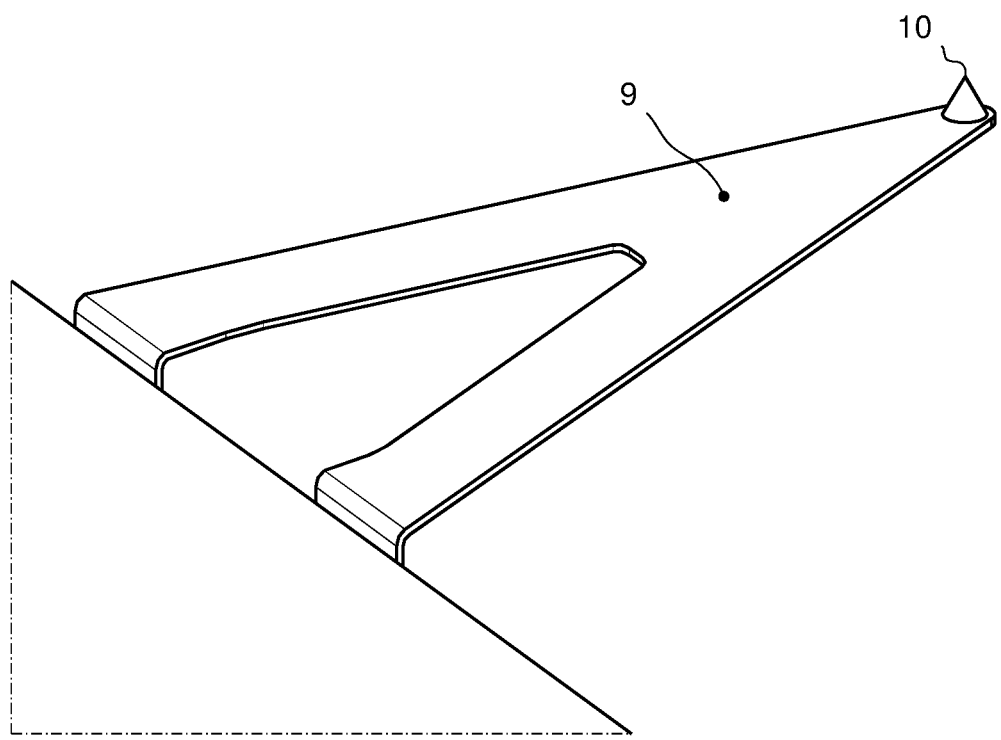
FIG. 12 is a scanning electron microscope (SEM) image of a probe that is useable in an embodiment of the invention.

FIG. 11 illustrates a further example of a normal probe with cantilever 9 and probe tip 10, that can be used in combination with subharmonic modes in an embodiment of the present invention. A further example of such a regular type probe suitable for use in combination with subharmonic modes is the probe of FIG. 12.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the scope of the invention, as is determined by the claims. The invention may be practiced otherwise then as specifically described herein, and is only limited by the appended claims.

The invention claimed is:

1. A method of performing surface measurements on a surface of a sample using a scanning probe microscopy system, the system comprising a sample support structure for supporting a sample, a sensor head including a probe comprising a cantilever and a probe tip arranged on the cantilever, and an actuator for scanning the probe tip relative to the substrate surface for mapping of the nanostructures, the method comprising:

vibrating the cantilever using an actuator;

moving the probe relative to the substrate surface for performing said scanning, wherein said probe is held at a distance to the substrate surface such as to allow contact at a plurality of intermittent contact moments between the probe tip and the surface during said vibrating of the cantilever;

wherein the steps of vibrating of the cantilever and moving of the probe are performed concurrently, and wherein for performing the surface measurements, the method comprises:

obtaining, using a sensor, a sensor signal indicative of a position of the probe tip during said scanning; and analyzing, using a processor, said sensor signal by quantifying two or more frequency components in a Fourier transform of said sensor signal for determining an estimate of a force value of a force between said substrate surface and said probe tip during said contact moments;

wherein said analyzing comprises applying a recursive filter for estimating an internal state of the probe based on the two or more frequency components in the Fourier transform of the sensor signal, and using the estimated internal state for determining the estimate of the force value.

2. The method according to claim 1, wherein the recursive filter is a Kalman filter, and wherein the recursive filter further includes a dynamic state model for modeling an influence of the force between the substrate surface and the probe tip on said internal state of the probe.

3. The method according to claim 2, wherein for determining the force value during said contact moments, during said analyzing the sensor signal is sampled into a plurality of samples, each sample corresponding to a sample moment, wherein the recursive filter applies the following augmented system state model for including said internal state of the probe and said dynamic state model:

$$\begin{pmatrix} x_{k+1} \\ p_{k+1} \end{pmatrix} = \underbrace{\begin{bmatrix} A & B\hat{C} \\ O & \hat{A} \end{bmatrix}}_{\mathcal{A}} \begin{pmatrix} x_k \\ p_k \end{pmatrix} + \underbrace{\begin{bmatrix} B_2 \\ O \end{bmatrix}}_{\mathcal{B}} f_k^d + \begin{pmatrix} \omega_k \\ \hat{\omega}_k \end{pmatrix}$$

$$\begin{pmatrix} y_k \\ O_{N\times 1} \end{pmatrix} = \underbrace{\begin{bmatrix} C & D_1\hat{C} \\ O & \hat{C}^{(2)} \end{bmatrix}}_{\mathcal{C}} \begin{pmatrix} x_k \\ p_k \end{pmatrix} + \underbrace{\begin{bmatrix} D_2 \\ O \end{bmatrix}}_{\mathcal{D}} f_k^d + \begin{pmatrix} v_k \\ \hat{v}_k \end{pmatrix},$$

$$f_k^{ts} = \begin{bmatrix} O_{1\times n} & \hat{C} \end{bmatrix} \begin{pmatrix} x_k \\ p_k \end{pmatrix}$$

wherein:

$x_k$ is an internal state of the system at sample moment k;

$x_{k+1}$ is an internal state of the system at sample moment k+1 subsequent to sample moment k;

$p_k$ is a dynamic state of the influence of the force between the probe tip and the substrate surface at sample moment k;

$p_{k+1}$ is a dynamic state of the influence of the force between the probe tip and the substrate surface at sample moment k+1;

$v_k$, $\hat{v}_k$, $\omega_k$ and $\hat{\omega}_k$ represent noise factors;

$f_k^d$ represents a dithering signal to the internal state;

$f_k^{ts}$ represents the force value of the force between the probe tip and the substrate surface;

A is the state matrix of the system;

$B_1$ and $B_2$ are the input matrices for respectively force value of the force between the probe tip and the substrate surface and the dithering signal;

$D_1$ and $D_2$ are the feed forward matrices for respectively force value of the force between the probe tip and the substrate surface and the dithering signal; O is the null-matrix;

C is the output matrix;

$\hat{A}$ and $\hat{C}$ are respectively the dynamic state matrix and the dynamic output matrix of the dynamic state model for modelling the influence of the force between the substrate surface and the probe tip on said internal state of the probe; and $\hat{C}^{(2)}$ is the output matrix of a Tikhonov type regularization rule.

4. The method according to claim 3, wherein:

$$\hat{A} = I_{N\times N} \otimes \begin{bmatrix} 1 & 0 & 0 \\ 1 & 0 & 0 \\ 0 & 1 & 0 \end{bmatrix};$$

$$\hat{C} = 1_{1\times N} \otimes \begin{bmatrix} 1 & 0 & 0 \end{bmatrix}; \text{ and}$$

wherein:

-continued $$\hat{C}^{(2)} = \begin{bmatrix} 1, & \frac{\Omega^2}{\Omega_f^2}-2, & 1, & & & O_{1\times 3(N-1)} \\ O_{1\times 3}, & 1, & \frac{(2\Omega)^2}{\Omega_f^2}-2, & 1, & & O_{1\times 3(N-2)} \\ O_{1\times 6}, & 1, & \frac{(3\Omega)^2}{\Omega_f^2}-2, & 1, & & O_{1\times 3(N-3)} \\ & & & \ddots & & \\ O_{1\times 3(N-1)}, & & 1, & \frac{(N\Omega)^2}{\Omega_f^2}-2, & 1 \end{bmatrix},$$

where $\Omega$ and $\Omega_f$ are respectively the resonance frequency of the probe and the sampling frequency of the sensor signal.

5. The method according to claim 1, further comprising receiving, during initializing of the system for performing the step of analyzing, an indication of a number of frequency components in the Fourier transform of the sensor signal which provide a signal strength that is larger than a noise level.

6. The method according to claim 2, wherein said step of analyzing comprises the steps of:
calculating an a priori estimate of the internal state of the probe;
calculating an a priori error estimate;
calculate a Kalman gain matrix;
calculate an a posteriori estimate of the internal state based on the Kalman gain matrix, the sensor signal, and the a priori estimate of the internal state of the probe;
calculate an a posteriori error estimate based on the a priori error and the Kalman gain matrix; and
calculate, using the a posteriori estimate of the internal state, the estimated force value of the force between said substrate surface and said probe tip during said contact moments.

7. The method according to claim 1, further comprising providing an output signal indicative of the estimated force value of the force between the substrate surface and the probe tip during said periodic contact moments.

8. The method according to claim 1, further comprising:
obtaining a predefined reference force value;
comparing the determined estimated force value with the predefined reference force value for obtaining a difference value; and
providing a feedback signal to the sensor head or to a controller such as to adapt the distance between the probe and the substrate surface for minimizing the difference value.

9. The method according to claim 8, wherein the system further comprising a distance sensor for determining a distance between the probe and the substrate support structure in a direction perpendicular to the substrate surface, and wherein the method comprises obtaining a distance signal from the distance sensor and using the distance signal for providing topology information of the substrate surface.

10. The method according to claim 1, wherein the probe comprises a cantilever having a shape and dimensions such as to comprise at least one of the group consisting of:
one or more harmonic modes at a frequency being an integer multiple of a ground resonance frequency of the cantilever; and
one or more sub-harmonic modes at a frequency being an inverse integer multiple of a ground resonance frequency of the cantilever, wherein the inverse integer is equal to 1/n and wherein n is an integer.

11. The method according to claim 1, wherein the probe is an element taken from the group consisting of: linear probes, harmonic probes comprising two or more resonance frequencies, interferometric force sensing probes, and dynamic compliant probes.

12. A scanning probe microscopy system comprising a sample support structure for supporting a sample, a sensor head including a probe comprising a cantilever and a probe tip arranged on the cantilever, and an actuator for scanning the probe tip relative to the substrate surface for mapping of the nanostructures, wherein the sensor head comprises a vibration actuator for vibrating the cantilever of the probe during scanning, and sensor unit for obtaining a sensor signal indicative of a position of the probe tip during scanning; wherein the system further comprises a processor configured for applying a method comprising:
vibrating the cantilever using an actuator;
moving the probe relative to the substrate surface for performing said scanning, wherein said probe is held at a distance to the substrate surface such as to allow contact at a plurality of intermittent contact moments between the probe tip and the surface during said vibrating of the cantilever;
wherein the steps of vibrating of the cantilever and moving of the probe are performed concurrently, and wherein for performing the surface measurements, the method comprises:
obtaining, using a sensor, a sensor signal indicative of a position of the probe tip during said scanning; and
analyzing said sensor signal by quantifying two or more frequency components in a Fourier transform of said sensor signal for determining an estimate of a force value of a force between said substrate surface and said probe tip during said contact moments,
wherein said analyzing comprises applying a recursive filter for estimating an internal state of the probe based on the two or more frequency components in the Fourier transform of the sensor signal, and using the estimated internal state for determining the estimate of the force value.

13. The system according to claim 12, wherein the recursive filter is a Kalman filter, and wherein the recursive filter further includes a dynamic state model for modelling an influence of the force between the substrate surface and the probe tip on said internal state of the probe;
wherein for determining the force value during said contact moments, the recursive filter applies the following augmented system state model:

$$\begin{pmatrix} x_{k+1} \\ p_{k+1} \end{pmatrix} = \underbrace{\begin{bmatrix} A & B\hat{C} \\ O & \hat{A} \end{bmatrix}}_{\overline{A}} \begin{pmatrix} x_k \\ p_k \end{pmatrix} + \underbrace{\begin{bmatrix} B_2 \\ O \end{bmatrix}}_{\overline{B}} f_k^d + \begin{pmatrix} \omega_k \\ \hat{\omega}_k \end{pmatrix}$$

$$\begin{pmatrix} y_k \\ O_{N\times 1} \end{pmatrix} = \underbrace{\begin{bmatrix} C & D_1\hat{C} \\ O & \hat{C}^{(2)} \end{bmatrix}}_{\overline{C}} \begin{pmatrix} x_k \\ p_k \end{pmatrix} + \underbrace{\begin{bmatrix} D_2 \\ O \end{bmatrix}}_{\overline{D}} f_k^d + \begin{pmatrix} v_k \\ \hat{v}_k \end{pmatrix},$$

$$f_k^{ts} = \begin{bmatrix} O_{1\times n} & \hat{C} \end{bmatrix} \begin{pmatrix} x_k \\ p_k \end{pmatrix}$$

wherein:
$x_k$ is an internal state of the system at sample moment k;

$x_{k+1}$ is an internal state of the system at sample moment k+1 subsequent to sample moment k;

$p_k$ is a dynamic state of the influence of the force between the probe tip and the substrate surface at sample moment k;

$p_{k+1}$ is a dynamic state of the influence of the force between the probe tip and the substrate surface at sample moment k+1;

$v_k$, $\hat{v}_k$, $\omega_k$ and $\hat{\omega}_k$ represent noise factors;

$f_k^d$ represents a dithering signal to the internal state;

$f_k^{ts}$ represents the force value of the force between the probe tip and the substrate surface;

A is the state matrix of the system;

$B_1$ and $B_2$ are the input matrices for respectively force value of the force between the probe tip and the substrate surface and the dithering signal;

$D_1$ and $D_2$ are the feed forward matrices for respectively force value of the force between the probe tip and the substrate surface and the dithering signal;

O is the null-matrix;

C is the output matrix;

$\hat{A}$ and $\hat{C}$ are respectively the dynamic state matrix and the dynamic output matrix of the dynamic state model for modelling the influence of the force between the substrate surface and the probe tip on said internal state of the probe; and $\hat{C}^{(2)}$ is the output matrix of a Tikhonov type regularization rule;

and wherein further:

$$\hat{A} = I_{N \times N} \otimes \begin{bmatrix} 1 & 0 & 0 \\ 1 & 0 & 0 \\ 0 & 1 & 0 \end{bmatrix};$$

$$\hat{C} = 1_{1 \times N} \otimes [1 \ 0 \ 0]; \text{ and}$$

wherein $$\hat{C}^{(2)} = \begin{bmatrix} 1, & \frac{\Omega^2}{\Omega_f^2} - 2, & 1, & & & O_{1 \times 3(N-1)} \\ O_{1 \times 3}, & 1, & \frac{(2\Omega)^2}{\Omega_f^2} - 2, & 1, & & O_{1 \times 3(N-2)} \\ O_{1 \times 6}, & 1, & \frac{(3\Omega)^2}{\Omega_f^2} - 2, & 1, & & O_{1 \times 3(N-3)} \\ & & & \ddots & & \\ O_{1 \times 3(N-1)}, & & 1, & \frac{(N\Omega)^2}{\Omega_f^2} - 2, & 1 \end{bmatrix},$$

where $\Omega$ and $\Omega_f$ are respectively the resonance frequency of the probe and the sampling frequency of the sensor signal.

14. The system according to claim 13, wherein:

$$\hat{A} = I_{N \times N} \otimes \begin{bmatrix} 1 & 0 & 0 \\ 1 & 0 & 0 \\ 0 & 1 & 0 \end{bmatrix};$$

$$\hat{C} = 1_{1 \times N} \otimes [1 \ 0 \ 0]; \text{ and wherein}$$

$$\hat{C}^{(2)} = \begin{bmatrix} 1, & \frac{\Omega^2}{\Omega_f^2} - 2, & 1, & & & O_{1 \times 3(N-1)} \\ O_{1 \times 3}, & 1, & \frac{(2\Omega)^2}{\Omega_f^2} - 2, & 1, & & O_{1 \times 3(N-2)} \\ O_{1 \times 6}, & 1, & \frac{(3\Omega)^2}{\Omega_f^2} - 2, & 1, & & O_{1 \times 3(N-3)} \\ & & & \ddots & & \\ O_{1 \times 3(N-1)}, & & 1, & \frac{(N\Omega)^2}{\Omega_f^2} - 2, & 1 \end{bmatrix},$$

where $\Omega$ and $\Omega_f$ are respectively the resonance frequency of the probe and the sampling frequency of the sensor signal.

15. The system according to claim 12, wherein the method further comprises: receiving, during initializing of the system for performing the step of analyzing, an indication of a number of frequency components in the Fourier transform of the sensor signal which provide a signal strength that is larger than a noise level.

16. The system according to claim 12, wherein the method further comprises:
obtaining a predefined reference force value;
comparing the determined estimated force value with the predefined reference force value for obtaining a difference value; and
providing a feedback signal to the sensor head or to a controller such as to adapt the distance between the probe and the substrate surface for minimizing the difference value.

17. The system of claim 16, wherein the system further comprises a distance sensor for determining a distance between the probe and the substrate support structure in a direction perpendicular to the substrate surface, and wherein the method further comprises obtaining a distance signal from the distance sensor and using the distance signal for providing topology information of the substrate surface.

18. A non-transitory computer-readable medium including computer-executable instructions that, when executed by a processor of a scanning probe microscopy system including a sample support structure for supporting a sample, a sensor head including a probe comprising a cantilever and a probe tip arranged on the cantilever, and an actuator for scanning the probe tip relative to the substrate surface for mapping of the nanostructures, causes the system to perform a method comprising:
vibrating the cantilever using an actuator;
moving the probe relative to the substrate surface for performing said scanning, wherein said probe is held at a distance to the substrate surface such as to allow contact at a plurality of intermittent contact moments between the probe tip and the surface during said vibrating of the cantilever;
wherein the steps of vibrating of the cantilever and moving of the probe are performed concurrently, and wherein for performing the surface measurements, the method comprises:
obtaining, using a sensor, a sensor signal indicative of a position of the probe tip during said scanning; and
analyzing said sensor signal by quantifying two or more frequency components in a Fourier transform of said sensor signal for determining an estimate of a force value of a force between said substrate surface and said probe tip during said contact moments, wherein said analyzing comprises applying a recursive filter for estimating an internal state of the probe based on the two or more frequency components in the Fourier transform of the sensor signal, and using the estimated internal state for determining the estimate of the force value.

19. The non-transitory computer-readable medium of claim 18, wherein the recursive filter is a Kalman filter, the recursive filter further including a dynamic state model for modelling an influence of the force between the substrate surface and the probe tip on said internal state of the probe;
wherein for determining the force value during said contact moments, during said analyzing the sensor signal is sampled into a plurality of samples, each sample corresponding to a sample moment, wherein the recursive filter applies the following augmented system state model for including said internal state of the probe and said dynamic state model:

$$\begin{pmatrix} x_{k+1} \\ p_{k+1} \end{pmatrix} = \underbrace{\begin{bmatrix} A & B\hat{C} \\ O & \hat{A} \end{bmatrix}}_{A} \begin{pmatrix} x_k \\ p_k \end{pmatrix} + \underbrace{\begin{bmatrix} B_2 \\ O \end{bmatrix}}_{B} f_k^d + \begin{pmatrix} \omega_k \\ \hat{\omega}_k \end{pmatrix}$$

$$\begin{pmatrix} y_k \\ O_{N \times 1} \end{pmatrix} = \underbrace{\begin{bmatrix} C & D_1\hat{C} \\ O & \hat{C}^{(2)} \end{bmatrix}}_{C} \begin{pmatrix} x_k \\ p_k \end{pmatrix} + \underbrace{\begin{bmatrix} D_2 \\ O \end{bmatrix}}_{D} f_k^d + \begin{pmatrix} v_k \\ \hat{v}_k \end{pmatrix},$$

$$f_k^{ts} = [O_{1 \times n} \hat{C}] \begin{pmatrix} x_k \\ p_k \end{pmatrix}$$

wherein:
$x_k$ is an internal state of the system at sample moment k;
$x_{k+1}$ is an internal state of the system at sample moment k+1 subsequent to sample moment k;
$p_k$ is a dynamic state of the influence of the force between the probe tip and the substrate surface at sample moment k;
$p_{k+1}$ is a dynamic state of the influence of the force between the probe tip and the substrate surface at sample moment k+1;
$v_k$, $\hat{v}_k$, $\omega_k$ and $\hat{\omega}_k$ represent noise factors;
$f_k^d$ represents a dithering signal to the internal state;
$f_k^{ts}$ represents the force value of the force between the probe tip and the substrate surface;
A is the state matrix of the system;
$B_1$ and $B_2$ are the input matrices for respectively force value of the force between the probe tip and the substrate surface and the dithering signal;
$D_1$ and $D_2$ are the feed forward matrices for respectively force value of the force between the probe tip and the substrate surface and the dithering signal; O is the null-matrix;
C is the output matrix;
$\hat{A}$ and $\hat{C}$ are respectively the dynamic state matrix and the dynamic output matrix of the dynamic state model for modelling the influence of the force between the substrate surface and the probe tip on said internal state of the probe; and
$\hat{C}^{(2)}$ is the output matrix of a Tikhonov type regularization rule.

20. The non-transitory computer readable medium according to claim 18, wherein the method further comprises receiving, during initializing of the system for performing the step of analyzing, an indication of a number of frequency components in the Fourier transform of the sensor signal which provide a signal strength that is larger than a noise level.

\* \* \* \* \*